United States Patent
Golin et al.

(10) Patent No.: US 8,561,395 B2
(45) Date of Patent: Oct. 22, 2013

(54) POKA-YOKE MOUNTING SYSTEM FOR AN EXHAUST TREATMENT DEVICE

(75) Inventors: Michael Golin, Dexter, MI (US); Rick Thompson, Jonesville, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 317 days.

(21) Appl. No.: 13/039,559

(22) Filed: Mar. 3, 2011

(65) Prior Publication Data

US 2012/0222413 A1 Sep. 6, 2012

(51) Int. Cl.
| | |
|---|---|
| F01N 3/02 | (2006.01) |
| F01N 3/10 | (2006.01) |
| B01D 50/00 | (2006.01) |
| B01D 59/50 | (2006.01) |
| B01D 39/00 | (2006.01) |
| B01D 46/00 | (2006.01) |

(52) U.S. Cl.
USPC ............. 60/311; 60/299; 55/483; 55/485; 55/503; 55/504

(58) Field of Classification Search
USPC ............ 60/297, 299, 311; 55/483, 485, 493, 55/496, 503, 504, 508
See application file for complete search history.

(56) References Cited

U.S. PATENT DOCUMENTS

| | | | |
|---|---|---|---|
| 7,410,192 B2 | 8/2008 | Ignaczak et al. | |
| 7,458,619 B2 | 12/2008 | Cassel et al. | |
| 7,520,539 B2 | 4/2009 | Ignaczak et al. | |
| 7,735,875 B2 | 6/2010 | Jimenez | |
| 7,775,561 B2 | 8/2010 | Swank | |
| 7,818,881 B2 | 10/2010 | Cai et al. | |
| 7,828,338 B2 | 11/2010 | Kertesz et al. | |
| 7,832,776 B2 | 11/2010 | Cassel et al. | |
| 2010/0269494 A1 * | 10/2010 | Saito et al. | 60/311 |

FOREIGN PATENT DOCUMENTS

| | | | |
|---|---|---|---|
| JP | 2591095 | 12/1998 | |
| JP | 4400133 | 11/2009 | |
| JP | 2010-043576 | 2/2010 | |
| JP | 2010-138832 | 6/2010 | |
| WO | WO 2010004790 A1 * | 1/2010 | F01N 3/28 |

* cited by examiner

Primary Examiner — Kenneth Bomberg
Assistant Examiner — Audrey K Bradley
(74) Attorney, Agent, or Firm — Harness, Dickey & Pierce, P.L.C.

(57) ABSTRACT

An exhaust treatment system includes an emissions treatment device for treating exhaust emitted from an internal combustion engine. The exhaust treatment system includes a frame adapted to support first and second spaced apart portions of the exhaust treatment system. The emissions treatment device interconnects the first and second portions and is in receipt of exhaust from the first portion and provides treated exhaust to the second portion. A first bracket is fixed to the frame and includes one of a protrusion and a receptacle. A second bracket is adapted to be fixed to the emissions treatment device and includes the other of the protrusion and the receptacle. The protrusion is positioned within the receptacle when the emissions treatment device is properly positioned. The protrusion interferes with one of the second bracket and the emissions treatment device to preclude assembly when the emissions treatment device is improperly positioned.

23 Claims, 5 Drawing Sheets

POKA-YOKE MOUNTING SYSTEM FOR AN EXHAUST TREATMENT DEVICE

FIELD

The present disclosure generally relates to a system for treating exhaust gases. More particularly, a system for interconnecting and supporting various exhaust treatment devices is described.

BACKGROUND

To reduce the quantity of $NO_x$ and particulate matter emitted to the atmosphere during internal combustion engine operation, a number of exhaust aftertreatment devices have been developed. A need for exhaust aftertreatment systems particularly arises when diesel combustion processes are implemented. Typical aftertreatment systems for diesel engine exhaust may include one or more of a diesel particulate filter (DPF), a selective catalytic reduction (SCR) system, a hydrocarbon (HC) injector, and a diesel oxidation catalyst (DOC).

During engine operation, the DPF traps soot emitted by the engine and reduces the emission of particulate matter (PM). Over time, the DPF becomes loaded and begins to clog. Periodically, regeneration or oxidation of the trapped soot in the DPF is required for proper operation. To regenerate the DPF, relatively high exhaust temperatures in combination with an ample amount of oxygen in the exhaust stream are needed to oxidize the soot trapped in the filter.

The DOC is typically used to generate heat useful for regenerating the soot loaded DPF. When hydrocarbons (HC) are sprayed over the DOC at or above a specific light-off temperature, the HC will oxidize. This reaction is highly exothermic and the exhaust gases are heated during light-off. The heated exhaust gases are used to regenerate the DPF.

Over time, however, the DPF may degrade and become less effective. Replacement of the DPF or another exhaust treatment device may be necessary. Alternatively, the exhaust treatment device may be serviced or otherwise rejuvenated when the exhaust treatment device is removed from the system.

DPFs, DOCs and the like have been coupled to relatively small displacement internal combustion engines for automotive use. It may also be desirable to treat the exhaust emitted from engines in other applications including diesel locomotives, stationary power plants and marine vessels. These systems may be equipped with relatively large diesel compression engines. The exhaust mass flow rate from the larger engines may be more than ten times the maximum flow rate typically provided. The size and weight of the exhaust treatment devices required for large engines may make the components unwieldy and very costly. Therefore, a need may exist in the art for an arrangement to easily service and support the devices for treating the exhaust output from a large diesel engine. Some of the exhaust treatment devices such as DPFs are relatively fragile and susceptible to fracture. Care should be taken during DPF replacement and operation to avoid impact loading. Furthermore, it may be desirable to maintain a predetermined exhaust flow direction through the exhaust treatment device and also a predetermined rotational alignment between exhaust treatment devices.

SUMMARY

This section provides a general summary of the disclosure, and is not a comprehensive disclosure of its full scope or all of its features.

An exhaust treatment system includes an emissions treatment device having an upstream end and a downstream end for treating exhaust emitted from an internal combustion engine. The exhaust treatment system includes a frame adapted to support first and second portions of the exhaust treatment system. The first and second portions of the system are spaced apart from one another. The emissions treatment device interconnects the first and second portions and is in receipt of exhaust from the first portion and provides treated exhaust to the second portion. A first bracket is fixed to the frame and includes one of a protrusion and a receptacle. A second bracket is adapted to be fixed to the emissions treatment device and includes the other of the protrusion and the receptacle. The protrusion is positioned within the receptacle when the emissions treatment device is properly positioned. The protrusion interferes with one of the second bracket and the emissions treatment device to preclude assembly when the emissions treatment device is improperly positioned.

An exhaust treatment system includes first, second and third emissions treatment devices positioned in series fluid communication with one another. The second emissions treatment device is removable from between the first and third emissions treatment devices. A first bracket is coupled to one of the first and third emissions treatment devices and includes one of a protrusion and a receptacle. A second bracket is fixed to the second emissions treatment device and includes the other of the protrusion and the receptacle. The protrusion is positioned within the receptacle when the second emissions treatment device is properly positioned. The protrusion interferes with one of the first bracket and the second emissions treatment device to preclude assembly when the second emissions treatment device is improperly positioned.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2A is a fragmentary perspective view of a portion of the exhaust aftertreatment system;

Corresponding reference numerals indicate corresponding parts throughout the several views of the drawings.

DETAILED DESCRIPTION

Example embodiments will now be described more fully with reference to the accompanying drawings.

Figure 1:
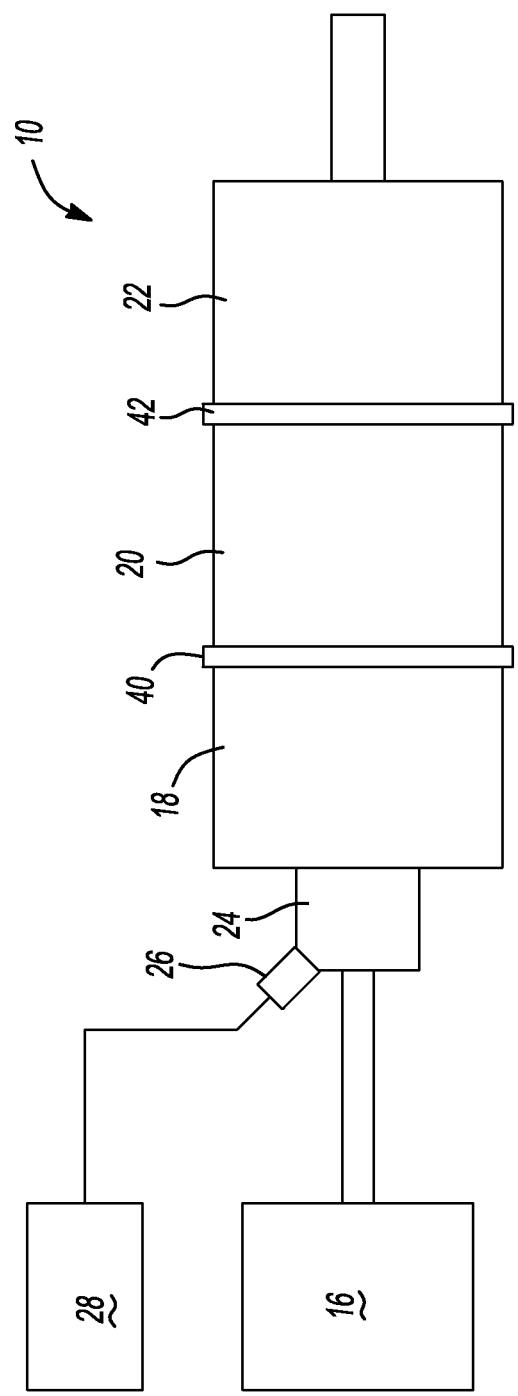
FIG. 1 is a schematic depicting an exhaust aftertreatment system including a poka-yoke mounting arrangement.

FIG. 1 depicts an exemplary diesel exhaust gas aftertreatment system 10 for treating the exhaust from a diesel compression engine 16. The exhaust may contain oxides of nitrogen ($NO_x$) such as nitric oxide (NO) and nitrogen dioxide ($NO_2$) among others, particular matter (PM), hydrocarbons, carbon monoxide (CO), and other combustion byproducts.

Aftertreatment system 10 includes multiple exhaust treatment devices, such as a diesel oxidation catalyst 18, connected downstream from engine 16 to receive the exhaust therefrom, a diesel particulate filter (DPF) 20 connected downstream from DOC 18, and a $NO_x$ reducing device 22, such as a selective catalytic reduction catalyst (SCR) or a lean $NO_x$ trap connected downstream from the DPF 20 to receive the exhaust therefrom.

A regeneration unit 24 may be positioned upstream of DOC 18 to increase the temperature of the engine exhaust and enhance the conversion efficiency of the $NO_x$ reducing device 22. Regeneration unit 24 raises the temperature of the exhaust entering diesel oxidation catalyst 18 to approximately 285° C. or greater to allow active HC dosing for active regeneration of DPF 20.

Regeneration unit 24 includes an injector 26 for injecting a suitable reductant. Reductants may include urea, hydrogen or a hydrocarbon. A control system, shown schematically at 28 in FIG. 1, is provided to monitor and control injector 26. Control system 28 may include suitable processor(s), sensors, flow control valves, electric coils, etc. to control injector 26.

Figure 2:
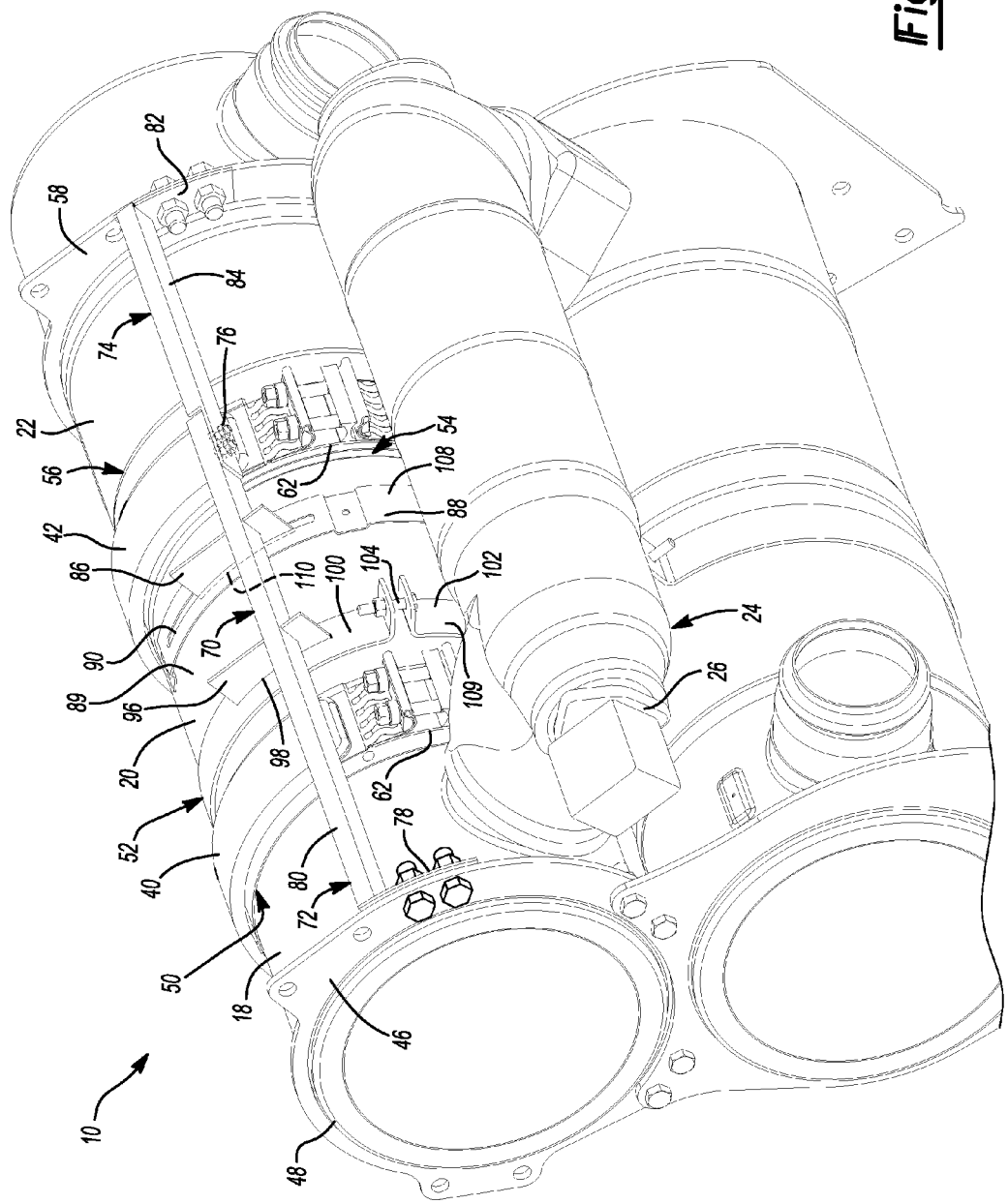
FIG. 2 is a perspective view of a portion of the exhaust aftertreatment system.
Figure 3:
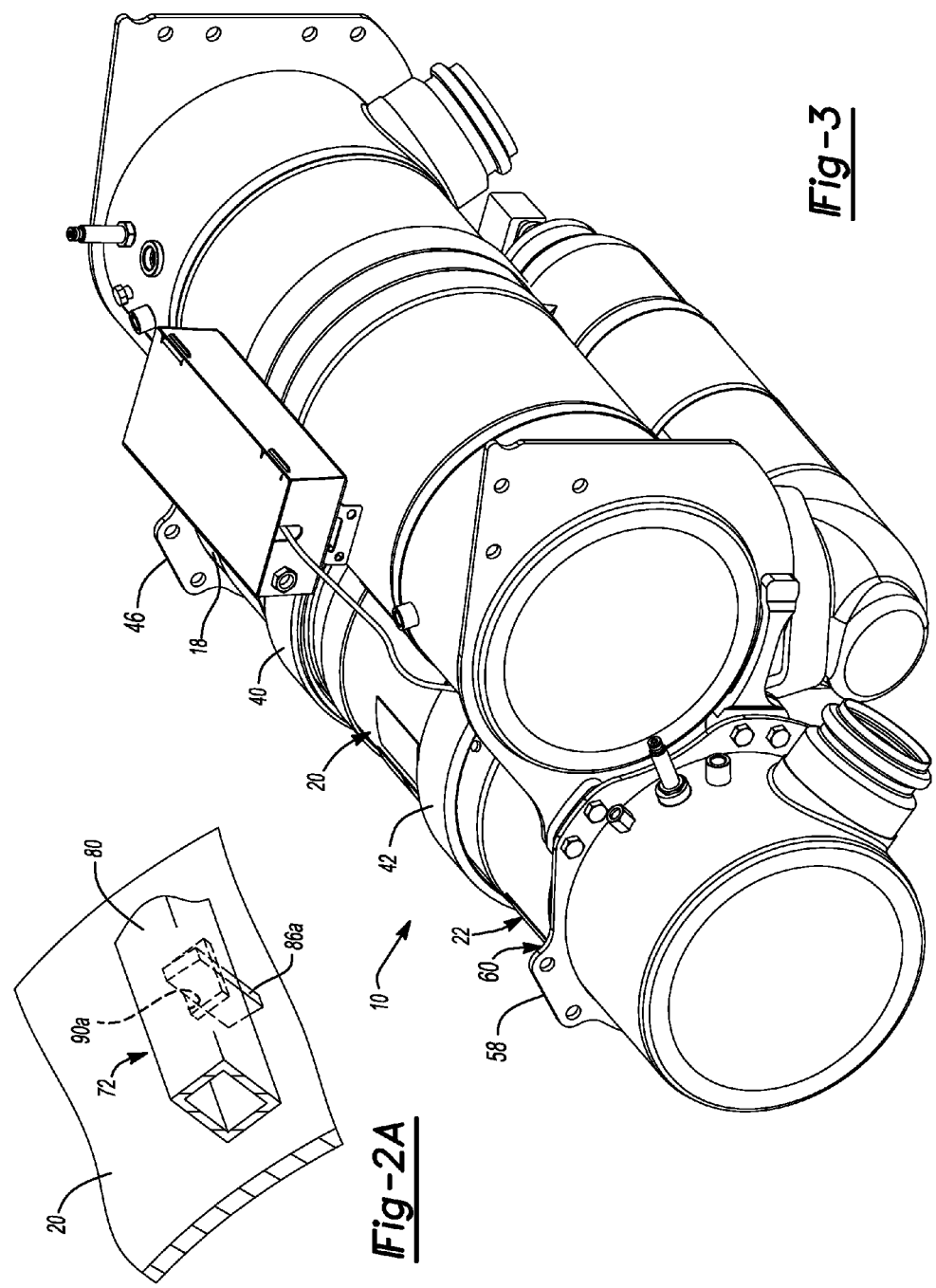
FIG. 3 is another perspective view of the poka-yoke system.
Figure 4:
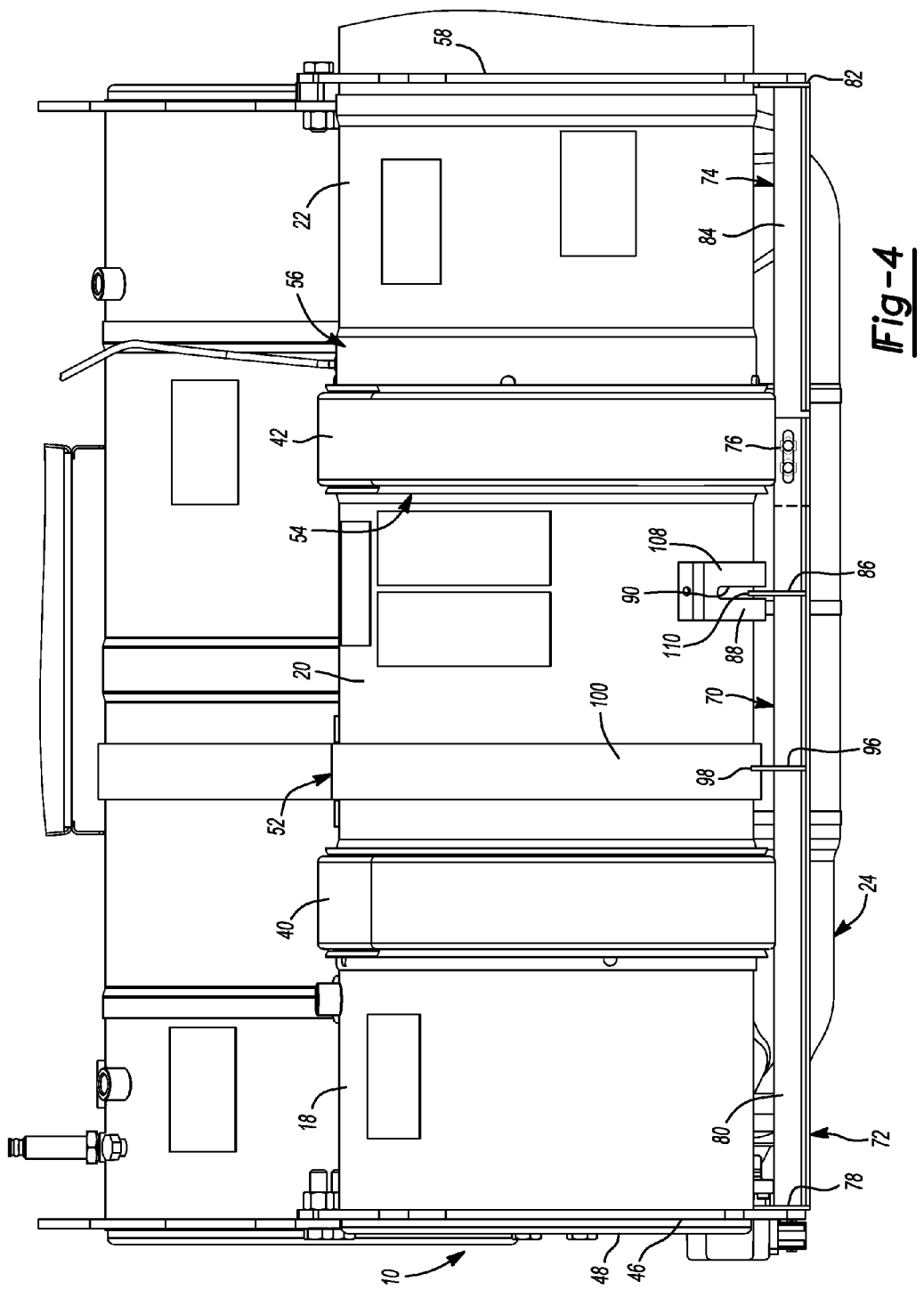
FIG. 4 is a side view of the poka-yoke mounting system.

As shown in FIGS. 2-4, DOC 18 and DPF 20 are interconnected by a first band clamp 40. In similar fashion, DPF 20 and SCR 22 are coupled to one another with a second band clamp 42. A first flange 46 is fixed to a first end 48 of DOC 18 by a suitable process such as welding. A second end 50 of DOC 18 is fixed to a first end 52 of DPF 20 by first band clamp 40. A second end 54 of DPF 20 is fixed to a first end 56 of SCR 22 by second band clamp 42. A second flange 58 is fixed to a second end 60 of SCR 22. First flange 46 and second flange 58 are fixed to a frame of the vehicle to support and mount exhaust gas aftertreatment system 10 at a desired location.

It should be appreciated that first flange 46 and second flange 58 are not directly fixed to DPF 20. As such, vibrations and/or impact loading that may be applied to the vehicle frame will not be directly applied to DPF 20. First band clamp 40 and second band clamp 42 each include an elastomeric material 62 acting as a damper between DOC 18 and DPF 20, as well as between DPF 20 and SCR 22.

As previously discussed, it may be desirable to easily remove DPF 20 from aftertreatment system 10 and accurately reinstall the DPF after cleaning or replacement. A poka-yoke system 70 includes a first bracket assembly 72 coupled to a second bracket assembly 74 by a removable fastener 76. A first end of bracket assembly 72 includes a flange 78 fixed to a first bar 80. Flange 78 is fixed to first flange 46. Second bracket assembly 74 includes a flange 82 fixed to a second bar 84. Flange 82 is coupled to second flange 58 via threaded fasteners (not shown). As noted, the opposite ends of bracket assemblies 72, 74 are interconnected to one another with fastener 76.

Poka-yoke system 70 also includes a protrusion or first blade 86 fixed to first bar 80 that radially extends substantially parallel to and axially offset from flange 78. A poka-yoke bracket 88 is fixed to an outer surface 89 of DPF 20 via a process such as spot welding. Poka-yoke bracket 88 is arcuately shaped and includes a receptacle or circumferentially extending slot 90 in receipt of first blade 86. The overall length or circumferential extent of slot 90 corresponds to the tolerance afforded to rotational alignment between DPF 20, DOC 18 and SCR 22. Rotational alignment or "clocking" of the exhaust treatment devices may be important because one or more of the treatment devices may include sensors that must be aligned with one another within a certain tolerance to properly function.

A second blade 96 is fixed to first bar 80. Second blade 96 includes an inner curved surface 98 defining its radially inward extent. Second blade 96 extends radially inwardly a lesser distance than first blade 86. A poka-yoke ring 100 is fixed to DPF 20 at a location axially spaced apart from poka-yoke bracket 88. In the example shown, poka-yoke ring 100 may include a simple band clamp defined by a spring ring 102 having ends drawn together by a fastener 104.

Second blade 96 is axially offset from first end 52 of DPF 20 a distance substantially similar to the distance first blade 86 is axially offset from second end 54 of DPF 20. By positioning the components in the manner described, a technician attempting to install DPF 20 in reverse will be precluded from doing so because first blade 86 will interfere with poka-yoke ring 100 due to the fact that no slot exists within poka-yoke ring 100. Reversing the exhaust flow direction through the DPF may be detrimental to the operation of exhaust aftertreatment system 10.

Additionally, relative rotational misalignment will be prevented because first blade 86 would interfere with an outer surface 108 of poka-yoke bracket 88 if first blade 86 were not properly aligned with slot 90. FIG. 2 depicts a male radially extending element as first blade 86 with a female receiving element being slot 90. It is contemplated that the relative positioning of the male and female members may be reversed without departing from the scope of the present disclosure. For example, and as shown in FIG. 2A, a radially outwardly extending member 86a may be fixed to DPF 20 and a receptacle, recess or slot 90a may be formed in first bracket assembly 72.

When first band clamp 40 and second band clamp 42 are tightened, an outer surface 109 of poka-yoke ring 100 is spaced apart a minimal distance from surface 98 of second blade 96. In similar fashion, an inner circumferential surface 110 of first blade 86 is spaced apart a relatively small distance from outer cylindrical surface 89 of DPF 20.

When used in conjunction with a large diesel engine such as that found on a locomotive or in a marine application, DPF 20 may weigh over 100 pounds. By defining the shape and location of first blade 86 and second blade 96, poka-yoke system 70 provides a cradle for supporting DPF 20 during the processes of installing and removing DPF 20 from system 10. In particular, outer surface 109 of poka-yoke ring 100 will engage surface 98 of second blade 96 and outer surface 89 of DPF 20 engages curved inner surface 110 of first blade 86 when first band clamp 40 and second band clamp 42 are released. To form a cradle and support DPF 20 as described, first bracket assembly 72 and second bracket assembly 74 are coupled to first flange 46 and second flange 58 at or near a point closest to the ground. Gravity will urge DPF 20 into contact with first blade 86 and second blade 96. Once first band clamp 40 and second band clamp 42 have been removed or axially displaced to a location clear of DPF 20, the DPF may be removed by radially translating the DPF in a direction opposite first blade 86 and second blade 96.

The reverse order of operations may be followed to install a cleaned DPF. For example, DPF 20 is oriented to position first end 52 at an upstream location. DPF 20 is lowered into contact with surface 110 of first blade 86 and surface 98 of second blade 96. DPF 20 is rotated until first blade 86 is aligned with slot 90. First band clamp 40 and second band clamp 42 are tightened. During the tightening process, outer surface 89 of DPF 20 disengages first blade 86 and second blade 96 to become coaxially aligned with DOC 18 and SCR 22.

Figure 5:
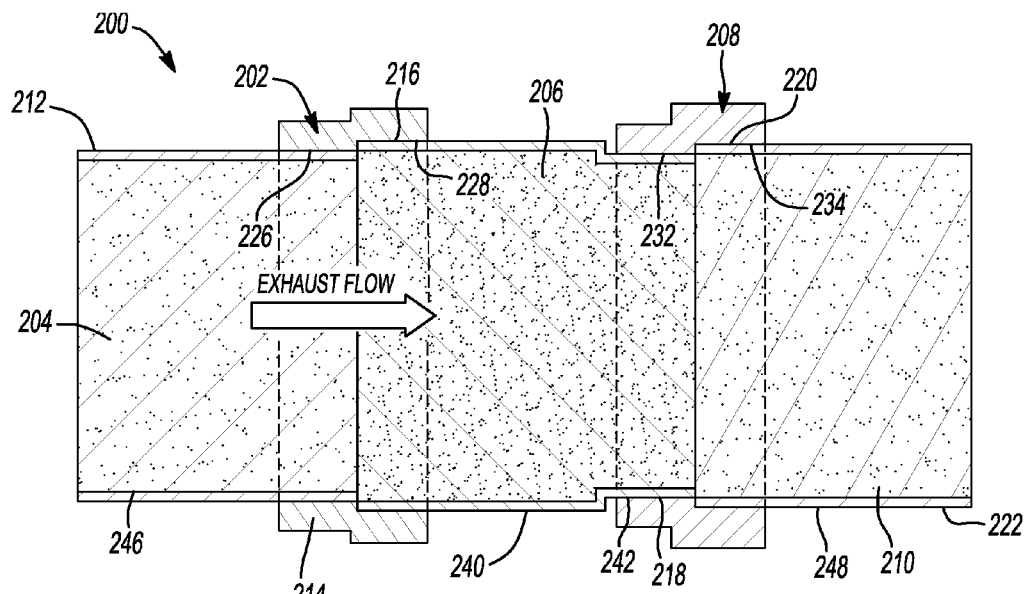
FIG. 5 is a schematic of an alternate poka-yoke system having exhaust treatment devices properly assembled.
Figure 6:
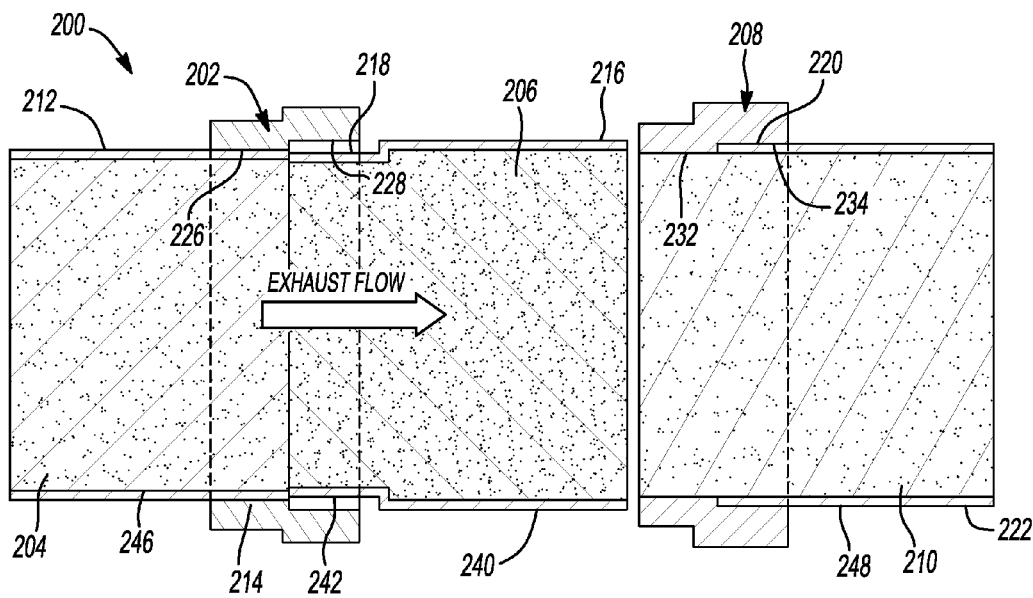
FIG. 6 is a schematic depicting the alternate poka-yoke system restricting improper installation of an exhaust treatment device.

FIGS. 5 and 6 depict an alternate poka-yoke system identified at reference numeral 200. Poka-yoke system 200 includes a first band clamp 202 interconnecting a DOC 204 and a DPF 206. A second band clamp 208 couples DPF 206 with an SCR 210. DOC 204 includes a first upstream end 212 and a second downstream end 214. DPF 206 includes a first upstream end 216 and a second downstream end 218. SCR 210 includes a first upstream end 220 and a second downstream end 222.

Poka-yoke system 200 assures proper upstream and downstream end orientation of DPF 206 by configuring first band clamp 202 to include a stepped inner diameter. More particularly, an upstream end of first band clamp 202 includes a first inner cylindrical surface 226. A downstream portion of first band clamp 202 includes an inner cylindrical surface 228 having a greater diameter than cylindrical surface 226. Similarly, second band clamp 208 includes an inner cylindrical surface 232 positioned at an upstream end defining a diameter. A larger inner diameter is defined by an inner cylindrical surface 234. Cylindrical surface 234 is positioned downstream from cylindrical surface 232.

DPF 206 includes a stepped outer diameter. A first upstream portion of DPF 206 includes an outer cylindrical surface 240. A downstream reduced diameter portion is defined by outer cylindrical surface 242. FIG. 5 depicts a properly oriented DPF 206 coupled to DOC 204 by first band clamp 202. DOC 204 includes an outer cylindrical surface 246 having a smaller outer diameter than outer surface 240 of DPF 206. Outer surface 246 is sized to closely mate with inner surface 226 of first band clamp 202. Outer surface 240 of DPF 206 is sized to cooperate with inner cylindrical surface 228 of first band clamp 202. In similar fashion, SCR 210 includes an outer cylindrical surface 248 having an outer diameter larger than cylindrical surface 242 of DPF 206. Outer cylindrical surface 248 is sized to cooperate with inner cylindrical surface 234 of second band clamp 208. Reduced diameter outer cylindrical surface 242 cooperates with reduced diameter inner cylindrical surface 232 of second band clamp.

FIG. 6 represents an interference condition that would exist if an operator attempted to install DPF 206 in reverse with downstream end 218 positioned upstream of upstream end 216. An interference condition would exist between outer cylindrical surface 240 and inner cylindrical surface 232. Furthermore, inner cylindrical surface 228 of first band clamp 202 would not engage reduced diameter outer cylindrical surface 242 of DPF 206. As such, poka-yoke system 200 assures proper orientation of DPF 206.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust treatment system including an emissions treatment device having an upstream end and a downstream end for treating exhaust emitted from an internal combustion engine, the system comprising:

a frame adapted to support first and second portions of the exhaust treatment system, the first and second portions of the system being spaced apart from one another, the emissions treatment device interconnecting the first and second portions, being in receipt of exhaust from the first portion and providing treated exhaust to the second portion;

a first bracket fixed to the frame and including a protrusion; and a second bracket permanently fixed to the emissions treatment device and including a receptacle, wherein the protrusion is positioned within the receptacle when the emissions treatment device is properly positioned and wherein the protrusion interferes with one of the second bracket and the emissions treatment device to preclude assembly when the emissions treatment device is improperly positioned.

2. The exhaust treatment system of claim 1, wherein the emissions treatment device includes a diesel particulate filter.

3. The exhaust treatment system of claim 1, further including another protrusion fixed to the first bracket, the another protrusion interfering with the emissions treatment device when the upstream and downstream orientation of the emissions treatment device is reversed.

4. The exhaust treatment system of claim 3, wherein the protrusion and the another protrusion each include seats defining a cradle to temporarily support the emissions treatment device during installation.

5. The exhaust treatment system of claim 1, wherein the first bracket is elongated, coupled to the frame at opposite ends and extends parallel to the emissions treatment device.

6. The exhaust treatment system of claim 5, wherein the protrusion transversely extends relative to a direction of exhaust flow.

7. The exhaust treatment system of claim 6, wherein the receptacle includes a circumferentially extending slot.

8. The exhaust treatment system of claim 7, wherein the protrusion includes a planar blade sized to be received within the slot.

9. The exhaust treatment system of claim 8, wherein the frame includes first and second radially extending flanges adapted to be fixed to the first and second portions, respectively.

10. An exhaust treatment system comprising:

first, second and third emissions treatment devices positioned in series fluid communication, the second emissions treatment device being removable from between the first and third emissions treatment devices;

a first bracket coupled to one of the first and third emissions treatment devices and including a protrusion; and a second bracket permanently fixed to the second emissions treatment device and including a receptacle, wherein the protrusion is positioned within the receptacle when the second emissions treatment device is properly positioned and wherein the protrusion interferes with one of the second bracket and the second emissions treatment device to preclude assembly when the second emissions treatment device is improperly positioned.

11. The exhaust treatment system of claim 10, further including another protrusion fixed to the first bracket, the another protrusion interfering with the second emissions treatment device when the upstream and downstream orientation of the second emissions treatment device is reversed.

12. The exhaust treatment system of claim 11, wherein the protrusion and the another protrusion each include seats defining a cradle to temporarily support the second emissions treatment device during installation.

13. The exhaust treatment system of claim 11, wherein the protrusion transversely extends relative to a direction of exhaust flow.

14. The exhaust treatment system of claim 13, wherein the receptacle includes a circumferentially extending slot.

15. The exhaust treatment system of claim 14, wherein the protrusion includes a planar blade sized to be received within the slot.

16. An exhaust treatment system including an emissions treatment device having an upstream end and a downstream end for treating exhaust emitted from an internal combustion engine, the system comprising:
a frame adapted to support first and second portions of the exhaust treatment system, the first and second portions of the system being spaced apart from one another, the emissions treatment device interconnecting the first and second portions, being in receipt of exhaust from the first portion and providing treated exhaust to the second portion;
a first bracket fixed to the frame and including one of a protrusion and a receptacle; and
a second bracket adapted to be fixed to the emissions treatment device and including the other of the protrusion and the receptacle, wherein the protrusion is positioned within the receptacle when the emissions treatment device is properly positioned and wherein the protrusion interferes with one of the second bracket and the emissions treatment device to preclude assembly when the emissions treatment device is improperly positioned, wherein the first bracket is elongated, coupled to the frame at opposite ends and extends parallel to the emissions treatment device.

17. The exhaust treatment system of claim 16, wherein the protrusion transversely extends relative to a direction of exhaust flow.

18. The exhaust treatment system of claim 17, wherein the receptacle includes a circumferentially extending slot.

19. The exhaust treatment system of claim 18, wherein the protrusion includes a planar blade sized to be received within the slot.

20. The exhaust treatment system of claim 19, wherein the frame includes first and second radially extending flanges adapted to be fixed to the first and second portions, respectively.

21. An exhaust treatment system including an emissions treatment device having an upstream end and a downstream end for treating exhaust emitted from an internal combustion engine, the system comprising:
a frame adapted to support first and second portions of the exhaust treatment system, the first and second portions of the system being spaced apart from one another, the emissions treatment device interconnecting the first and second portions, being in receipt of exhaust from the first portion and providing treated exhaust to the second portion;
a first bracket fixed to the frame and including one of a protrusion and a receptacle;
a second bracket adapted to be fixed to the emissions treatment device and including the other of the protrusion and the receptacle, wherein the protrusion is positioned within the receptacle when the emissions treatment device is properly positioned and wherein the protrusion interferes with one of the second bracket and the emissions treatment device to preclude assembly when the emissions treatment device is improperly positioned; and
another protrusion fixed to the first bracket, the another protrusion interfering with the emissions treatment device when the upstream and downstream orientation of the emissions treatment device is reversed, wherein the protrusion and the another protrusion each include seats defining a cradle to temporarily support the emissions treatment device during installation.

22. An exhaust treatment system comprising:
first, second and third emissions treatment devices positioned in series fluid communication, the second emissions treatment device being removable from between the first and third emissions treatment devices;
a first bracket coupled to one of the first and third emissions treatment devices and including one of a protrusion and a receptacle;
a second bracket fixed to the second emissions treatment device and including the other of the protrusion and the receptacle, wherein the protrusion is positioned within the receptacle when the second emissions treatment device is properly positioned and wherein the protrusion interferes with one of the first bracket and the second emissions treatment device to preclude assembly when the second emissions treatment device is improperly positioned; and
another protrusion fixed to the first bracket, the another protrusion interfering with the second emissions treatment device when the upstream and downstream orientation of the second emissions treatment device is reversed, wherein the protrusion transversely extends relative to a direction of exhaust flow, wherein the receptacle includes a circumferentially extending slot, and further wherein the protrusion includes a planar blade sized to be received within the slot.

23. An exhaust treatment system comprising:
first, second and third emissions treatment devices positioned in series fluid communication, the second emissions treatment device being removable from between the first and third emissions treatment devices;
a first bracket coupled to one of the first and third emissions treatment devices and including one of a protrusion and a receptacle;
a second bracket fixed to the second emissions treatment device and including the other of the protrusion and the receptacle, wherein the protrusion is positioned within the receptacle when the second emissions treatment device is properly positioned and wherein the protrusion interferes with one of the first bracket and the second emissions treatment device to preclude assembly when the second emissions treatment device is improperly positioned; and
another protrusion fixed to the first bracket, the another protrusion interfering with the second emissions treatment device when the upstream and downstream orientation of the second emissions treatment device is reversed, wherein the protrusion and the another protrusion each include seats defining a cradle to temporarily support the second emissions treatment device during installation.

* * * * *